(12) United States Patent
Moloney et al.

(10) Patent No.: US 12,223,170 B1
(45) Date of Patent: Feb. 11, 2025

(54) STORAGE ARRAY LATENCY ANALYSIS

(71) Applicant: Dell Products L.P., Round Rock, TX (US)

(72) Inventors: David Moloney, Carrigaline (IE); Eileen Kelleher, Wilton (IE); Colm O'Leary, Ovens (IE)

(73) Assignee: Dell Products L.P., Round Rock, TX (US)

( * ) Notice: Subject to any disclaimer, the term of this patent is extended or adjusted under 35 U.S.C. 154(b) by 8 days.

(21) Appl. No.: 18/229,850

(22) Filed: Aug. 3, 2023

(51) Int. Cl.
*G06F 3/06* (2006.01)

(52) U.S. Cl.
CPC .......... *G06F 3/0611* (2013.01); *G06F 3/0653* (2013.01); *G06F 3/0683* (2013.01)

(58) Field of Classification Search
CPC ..... G06F 3/0611; G06F 3/0653; G06F 3/0683
See application file for complete search history.

(56) References Cited

U.S. PATENT DOCUMENTS

| | | | |
|---|---|---|---|
| 2019/0121558 A1* | 4/2019 | Lee | G06F 3/0679 |
| 2023/0325089 A1* | 10/2023 | Rasal | G06F 3/0659 |
| | | | 711/154 |

* cited by examiner

*Primary Examiner* — Chie Yew
(74) *Attorney, Agent, or Firm* — Krishnendu Gupta; Nikhil Patel

(57) ABSTRACT

One or more aspects of the present disclosure relate to relate to analyzing and mitigation storage array latency. In embodiments, an input/output (IO) workload is received by a storage array. Additionally, a latency corresponding to processing one or more IO requests of the IO workload is determined. For example, a factor corresponding to a significant portion of the latency is identified. Further, a remediation action is performed based on the factor identified.

16 Claims, 3 Drawing Sheets

STORAGE ARRAY LATENCY ANALYSIS

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to analyzing and mitigating storage array latency. In embodiments, an input/output (IO) workload is received by a storage array. Additionally, a latency corresponding to processing one or more IO requests of the IO workload is determined. For example, a factor corresponding to a significant portion of the latency is identified. Further, a remediation action is performed based on the factor identified.

In embodiments, an external factor contributing to a first portion of the latency can be determined.

In embodiments, the external factor can include an external transfer time corresponding to the one or more IO requests.

In embodiments, a processing time corresponding to each device external to the storage array contributing to the transmitting or processing of each IO request in the IO workload can be measured. Additionally, the external transfer time can be calculated based on the processing time corresponding to each device external to the storage array contributing to the transmission or processing of each IO request in the IO workload.

In embodiments, an internal factor contributing to a second portion of the latency can be determined.

In embodiments, the internal factor includes an internal processing time corresponding to the one or more IO requests.

In embodiments, an IO path within the storage array corresponding to processing the one or more IO requests can be identified. For example, the IO path can include each component of the storage array involved with processing the one or more IO requests. In addition, each component's component processing time corresponding to the one or more IO requests can be measured. Further, the internal processing time can be calculated based on each component's component processing time.

In embodiments, a response time for each IO request can be calculated based on their respective external transfer times and internal processing times.

In embodiments, an anomaly corresponding to the external transfer times or the internal processing times of each IO request can be identified based on current and historical external transfer times and internal processing times. Further, a source corresponding to the anomaly can be determined.

In embodiments, the remediation action can be identified based on the source corresponding to the anomaly.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

A business like a financial or technology corporation can produce large amounts of data and require sharing access to that data among several employees. Such a business often uses storage arrays to store and manage the data. Because a storage array can include multiple storage devices (e.g., hard-disk drives (HDDs) or solid-state drives (SSDs)), the business can scale (e.g., increase or decrease) and manage an array's storage capacity more efficiently than a server. In addition, the business can use a storage array to read/write data required by one or more business applications.

Generally, a host (e.g., a client machine or application) can issue one or more IO messages to a storage array to read/write data on the storage array. In addition, a service level agreement (SLA) can define a performance corresponding to the storage array's processing of the IO messages. For example, the performance can include metrics like the storage array's response times. The response times can include a latency, defining the time to process an IO message. For example, response times can correspond to when a host issues an IO message to when the host receives an acknowledgment from the storage array.

Current naïve approaches to measuring latency cannot determine if a performance bottleneck is internal or external to/from a storage array. Embodiments of the present disclosure identify external and internal sources of latency corresponding to processing IO messages by a storage array. For example, the embodiments can identify external transfer times and internal storage array processing times corresponding to each IO message a storage array receives. The embodiments can identify entities contributing to the latency based on the external transfer times and internal storage array processing times. Further, the embodiments can identify the entities contributing to a significant portion of the latency and, thus, perform a remediation action.

Figure 1:
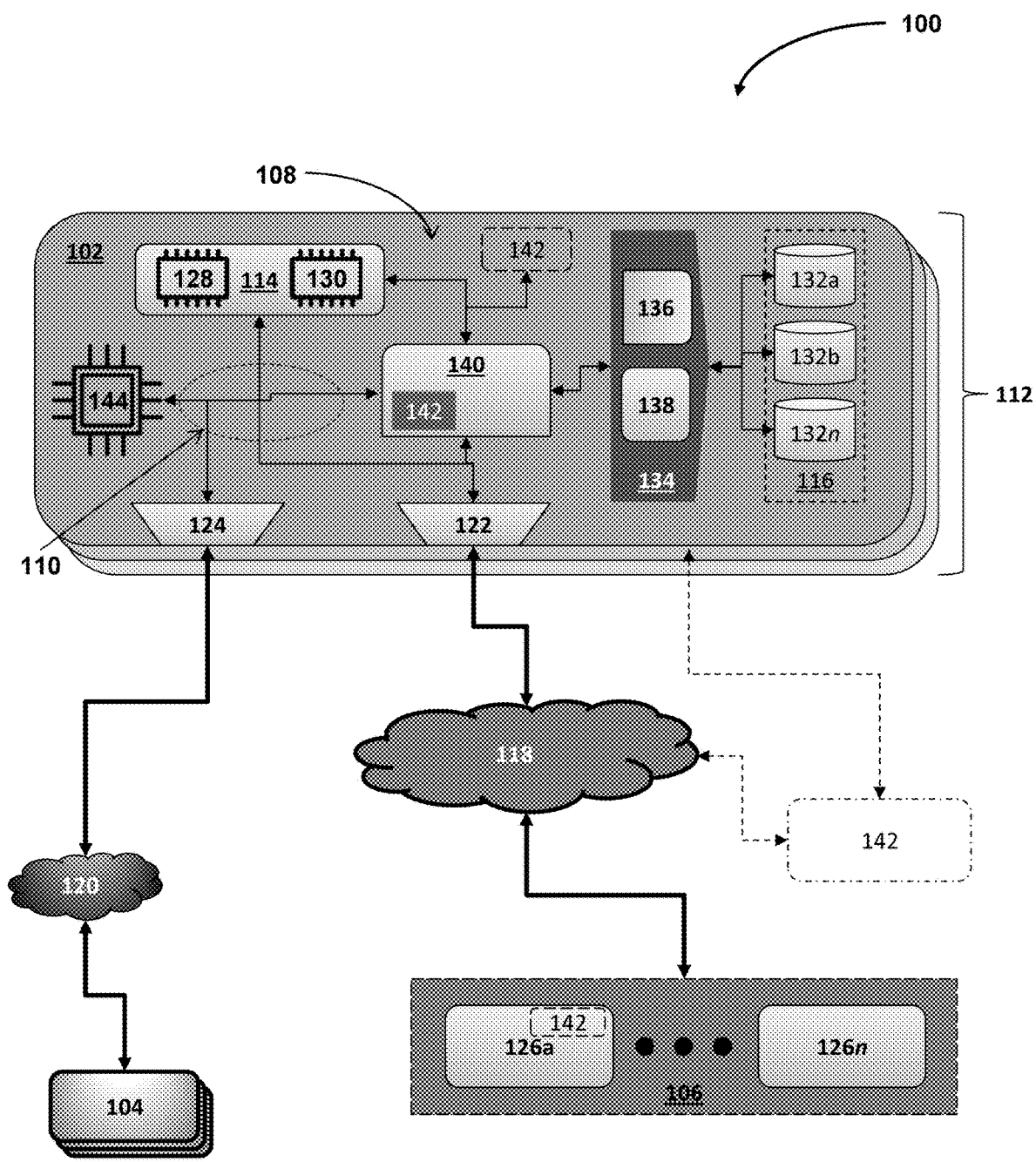
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108.

Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
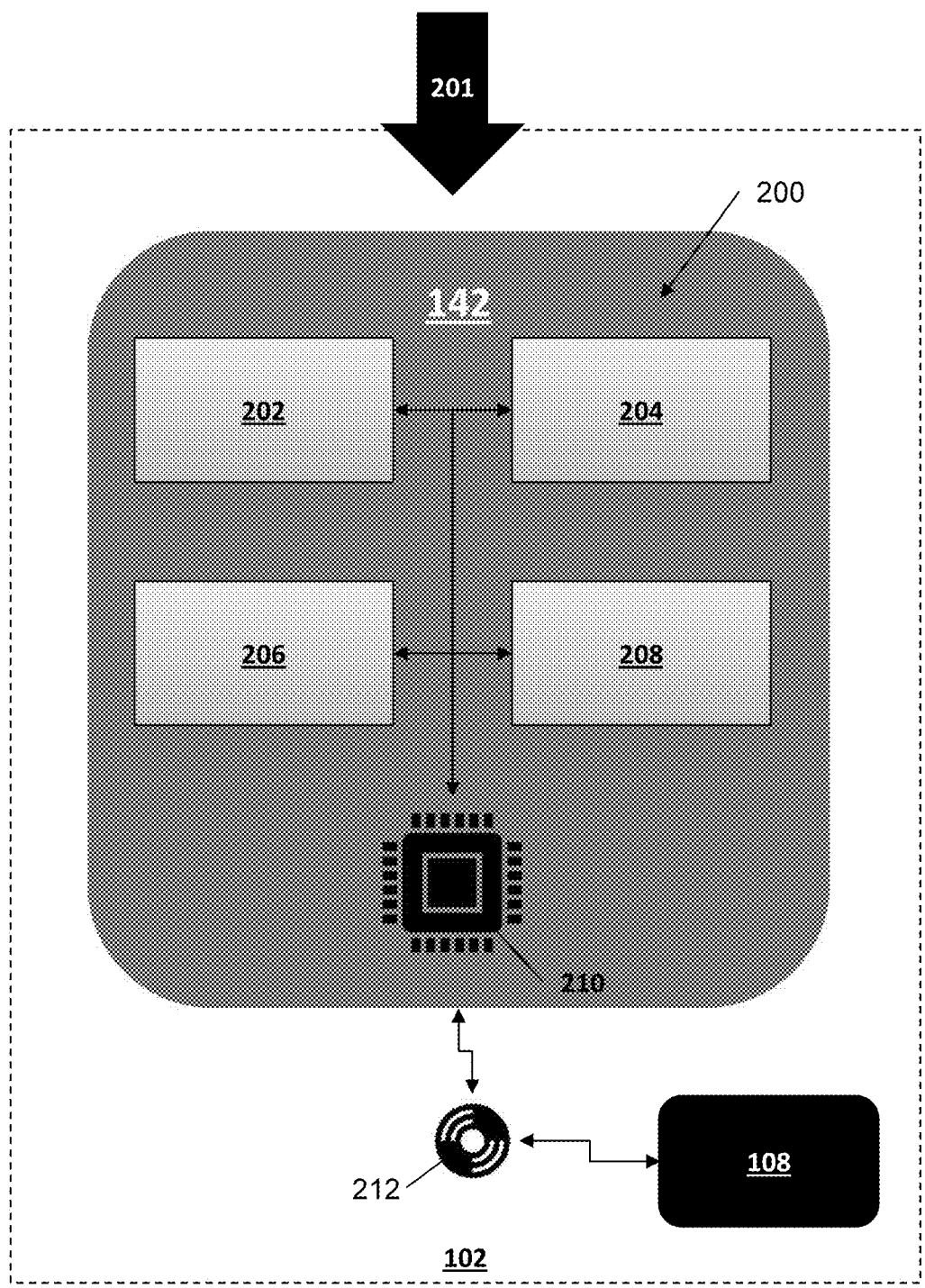
FIG. 2 is a block diagram of a controller in accordance with embodiments of the present disclosure.

Regarding FIG. 2, a storage array 102 can include a controller 142 with logic, hardware, and circuitry 200 that perform one or more data storage services. In embodiments, the controller 142 can include an input/output (IO) processor 202 that analyzes an IO workload 201 and its corresponding IO messages. The IO workload 201 can correspond to IO messages received by the storage array 102 during a given interval. Additionally, the IO processor 202 can identify characteristics corresponding to the IO workload 201 and its corresponding IO messages. The IO characteristics can include type, size, access rate, thread count, and read/write ratios.

Additionally, each IO message can include metadata (e.g., incremental counters) identifying IO processing times of entities external to the storage array 102. Further, the IO processor 202 can generate IO workload models predicting IO characteristics of future IO workloads and their corresponding IO messages. For example, the IO processor 202 can process current and historical IO characteristic data using a self-learning technique to generate and maintain the IO workload models in local memory 210. Further, the IO processor 202 can parse temporal metadata (e.g., start and receipt timestamps) from the IO messages to determine their travel times from corresponding hosts to the storage array 102.

In embodiments, the IO processor 202 can also return IO completion messages to the sources (e.g., hosts 106 of FIG. 1) of corresponding IO messages. For example, the IO completion messages inform the hosts that the storage array 102 has processed their corresponding IO messages. Further, the IO processor 202 can include a request for performance metrics (e.g., return response time) in an instruction field of the IO completion messages. Thus, the hosts can transmit the IO completion messages' temporal information (e.g., receipt time) to the storage array 102. Using the temporal information from the IO messages and the IO completion messages, the IO processor 202 can determine the response time for each IO message. Thus, the IO processor 202 can calculate an average response time for the IO workload.

Further, the controller 142 can also include an IO path analyzer 204 that monitors the array's components (e.g., the components 108 of FIG. 1) involved in processing each IO message of the IO workload 201. In embodiments, an IO path can define each component 108 involved with processing an IO message. For example, one or more daemons 212 can monitor the activity levels of the components 108 while processing IO messages. The daemons 212 can maintain activity logs that map each IO message (e.g., using a unique IO message identifier) to the activity of each component in each IO message's corresponding IO path in local memory 210. For instance, the activity logs can record each component's processing times. Thus, the IO path analyzer 204 can determine the storage array's internal IO processing time using the activity logs for an IO path's corresponding components 108.

In embodiments, the IO path analyzer 204 can generate IO path processing models predicting processing times of IO paths used to process IO messages of anticipated IO workloads. For example, using the IO workload models, the IO path analyzer 204 can identify IO paths and their components 108 for IO messages of a future IO workload.

In embodiments, the controller 142 can include an IO latency manager 208 with logic, hardware, and circuitry configured to perform one or more latency remediation operations. For example, the IO latency manager 208 can calculate an external response time based on the external transfer times determined by the IO processor 202. Additionally, the IO latency manager 208 can calculate internal processing times based on the IO processing times of each component and an IO message's corresponding IO path as identified by the IO path analyzer 204. Further, the IO latency manager can process current and historical data corresponding to external response and internal processing times using seasonal trend decomposition (e.g., using LOESS) and time series linear projection techniques to identify anomalies in either the external response or internal processing times.

In response to identifying an anomaly, the IO latency manager 208 can identify a source of the anomaly using the IO workload models and the IO path processing models. For example, the IO workload models can identify the external entities and internal storage array components contributing to each IO message's latency (e.g., total response time). Further, the IO latency manager 208 can perform a latency remediation action based on the identified source. For example, the local memory 210 can include a look-up table identifying remediation actions per identified source.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 3:
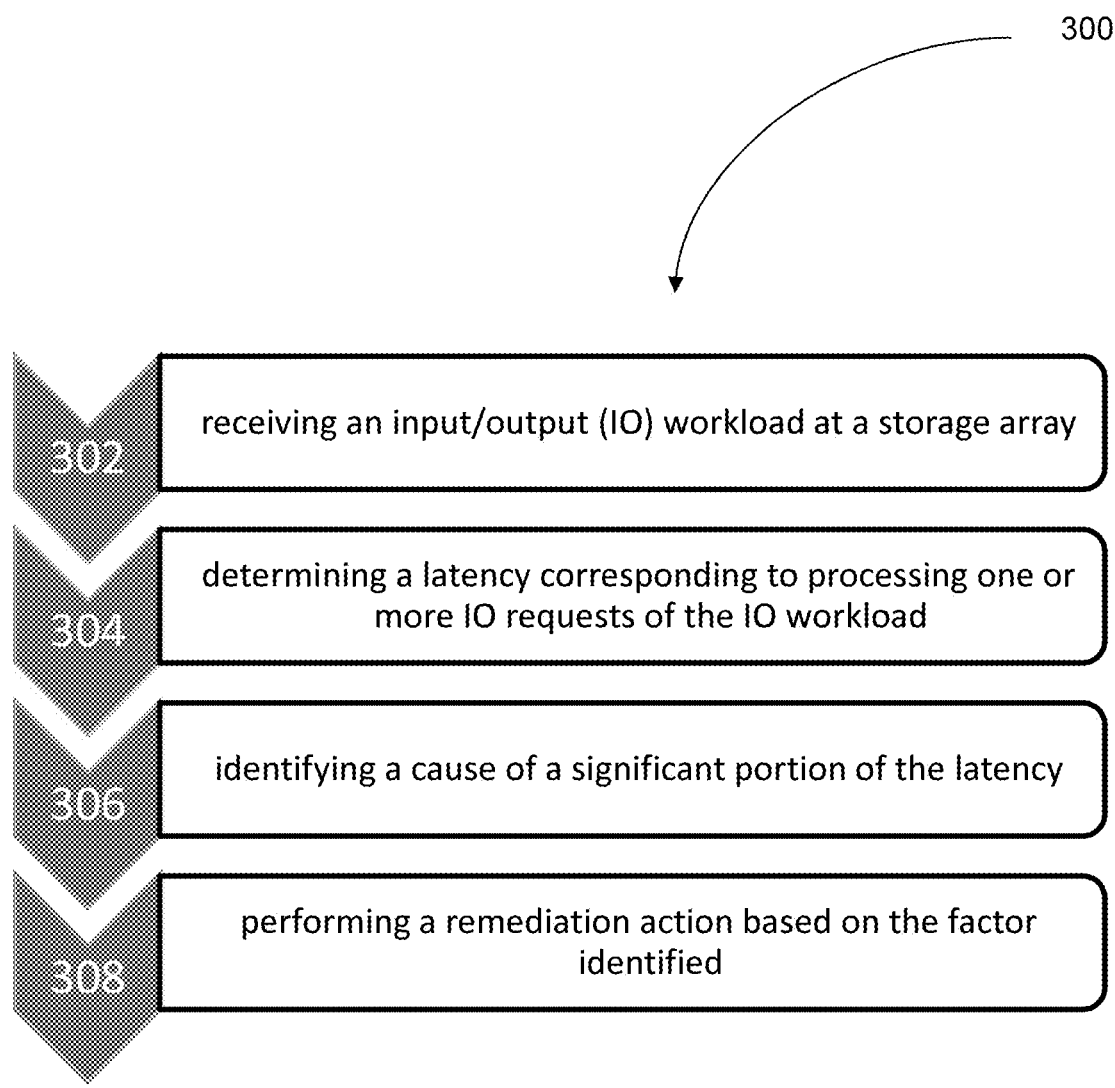
FIG. 3 is a flow diagram of a method for analyzing and mitigating storage array latency per embodiments of the present disclosure.

Regarding FIG. 3, a method 300 relates to analyzing and mitigating storage array latency. In embodiments, the controller 142 of FIG. 1 can perform all or a subset of operations corresponding to the method 300.

For example, the method 300, at 302, can include receiving an input/output (IO) workload at a storage array. Additionally, at 304, the method 300 can include determining a latency corresponding to processing one or more IO requests of the IO workload. Further, the method 300, at 306, can include identifying a cause of a significant portion of the latency. At 308, the method 300 can also include performing a remediation action based on the factor identified.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
receiving an input/output (IO) workload at a storage array;
determining a latency corresponding to processing one or more IO requests of the IO workload;
identifying a cause of a portion of the latency;
determining an external factor contributing to a first portion of the latency, wherein the external factor includes an external transfer time corresponding to the one or more IO requests; and
performing a remediation action based on the cause identified.

2. The method of claim 1, further comprising:
measuring a processing time, corresponding to each device external to the storage array, contributing to a transmission or processing of each of the one or more IO requests in the IO workload; and
calculating the external transfer time based on the processing time, corresponding to each device external to the storage array, contributing to the transmission or the processing of each of the one or more IO requests in the IO workload.

3. The method of claim 2, further comprising:
determining an internal factor contributing to a second portion of the latency.

4. The method of claim 3, wherein the internal factor includes an internal processing time corresponding to the one or more IO requests.

5. The method of claim 4, further comprising:
identifying an IO path, within the storage array, corresponding to processing the one or more IO requests, wherein the IO path corresponds to each component of the storage array involved with processing the one or more IO requests;
measuring each of the component's component processing time corresponding to the one or more IO requests; and
calculating the internal processing time based on each of the component's component processing time.

6. The method of claim 5, further comprising:
calculating a response time for each IO request based on their respective external transfer times and internal processing times.

7. The method of claim 6, further comprising:
identifying an anomaly corresponding to the external transfer times or the internal processing times corresponding to the one or more IO requests based on current and historical external transfer times and internal processing times; and
determining a source corresponding to the anomaly.

8. The method of claim 7, further comprising:
identifying the remediation action based on the source corresponding to the anomaly.

9. An apparatus including a memory and processor, the apparatus configured to:
receive an input/output (IO) workload at a storage array;
determine a latency corresponding to processing one or more IO requests of the IO workload;
identify a cause of a portion of the latency;
determine an external factor contributing to a first portion of the latency, wherein the external factor includes an external transfer time corresponding to the one or more IO requests; and
perform a remediation action based on the cause identified.

10. The apparatus of claim 9, further configured to:
measure a processing time, corresponding to each device external to the storage array, contributing to a transmission or processing of each of the one or more IO requests in the IO workload; and
calculate the external transfer time based on the processing time, corresponding to each device external to the storage array, contributing to the transmission or the processing of each of the one or more IO requests in the IO workload.

11. The apparatus of claim 10, further configured to:
determine an internal factor contributing to a second portion of the latency.

12. The apparatus of claim 11, wherein the internal factor includes an internal processing time corresponding to the one or more IO requests.

13. The apparatus of claim 12, further configured to:
identify an IO path, within the storage array, corresponding to processing the one or more IO requests, wherein the IO path corresponds to each component of the storage array involved with processing the one or more IO requests;
measure each of the component's component processing time corresponding to the one or more IO requests; and
calculate the internal processing time based on each of the component's component processing time.

14. The apparatus of claim 13, further configured to:
calculate a response time for each IO request based on their respective external transfer times and internal processing times.

15. The apparatus of claim 14, further configured to:
identify an anomaly corresponding to the external transfer times or the internal processing times corresponding to the one or more IO requests based on current and historical external transfer times and internal processing times; and
determining a source corresponding to the anomaly.

16. The apparatus of claim 15, further configured to:
identify the remediation action based on the source corresponding to the anomaly.

* * * * *